United States Patent [19]
Mohri et al.

[11] Patent Number: 5,672,554
[45] Date of Patent: Sep. 30, 1997

[54] ALUMINA COMPOSITION, ALUMINA MOLDED ARTICLE, ALUMINA CERAMICS, AND PROCESS FOR PRODUCING CERAMICS

[75] Inventors: Masahide Mohri; Norio Matsuda; Shinichiro Tanaka; Yoshio Uchida, all of Ibaraki, Japan

[73] Assignee: Sumitomo Chemical Company, Limited, Osaka, Japan

[21] Appl. No.: 654,029

[22] Filed: May 28, 1996

Related U.S. Application Data

[63] Continuation of Ser. No. 281,095, Jul. 27, 1994, abandoned.

[30] Foreign Application Priority Data

Jul. 27, 1993 [JP] Japan .................. 5-205902
Oct. 5, 1993 [JP] Japan .................. 5-249488

[51] Int. Cl.$^6$ .................................. C04B 35/10
[52] U.S. Cl. .............................. 501/127; 501/153
[58] Field of Search ................... 501/127, 153; 264/86, 62, 65

[56] References Cited

U.S. PATENT DOCUMENTS

| | | | |
|---|---|---|---|
| 3,615,306 | 10/1971 | Jones et al. | 501/127 |
| 4,822,592 | 4/1989 | Misra | 501/153 |
| 4,954,462 | 9/1990 | Wood et al. | 501/127 |
| 5,139,978 | 8/1992 | Wood | 501/153 |
| 5,277,702 | 1/1994 | Thibault et al. | 501/153 |
| 5,296,085 | 3/1994 | Faure et al. | 501/153 |
| 5,302,368 | 4/1994 | Harato et al. | 501/153 |

FOREIGN PATENT DOCUMENTS

| | | |
|---|---|---|
| A0105025 | 4/1984 | European Pat. Off. . |
| A0188388 | 7/1986 | European Pat. Off. . |
| A0224118 | 6/1987 | European Pat. Off. . |
| A0277730 | 8/1988 | European Pat. Off. . |
| A-59-156962 | 9/1984 | Japan . |
| A-2-167856 | 6/1990 | Japan . |

OTHER PUBLICATIONS

"Alumina as a Ceramic Material", Gitzen, American Ceramic Society Technical Literature (1970) pp. 7–28.

T. Ohigara, et al., "Preparation of Monodisperse, Spherical Alumina Powders from Alkoxides," *Journal of the American Ceramic Society*, vol. 74, No. 9, pp. 2263–2269 (1991).

*Primary Examiner*—Paul Marcantoni
*Attorney, Agent, or Firm*—Sughrue, Mion, Zinn, Macpeak and Seas

[57] ABSTRACT

An alumina composition, an alumina molded article, prepared from the alumina composition, an alumina ceramic prepared by sintering the alumina molded article, and a process for producing the ceramic; the alumina composition comprising α-alumina particles having a ratio of the shortest diameter to the longest diameter of from 0.3 to 1; and a size distribution of not more than 5, as expressed in terms of a $D_{90}/D_{10}$ ratio, wherein $D_{10}$ and $D_{90}$ represent a cumulative 10% diameter and a cumulative 90% diameter, respectively, of a cumulative distribution depicted from the small diameter side, or comprising α-alumina particles having a polyhedral shape; a D/H ratio of from 0.5 to 3.0, wherein D represents a maximum particle diameter parallel to a hexagonal lattice plane of a hexagonal close-packed lattice of α-alumina, and H represents a particle diameter perpendicular to the lattice plane; and a size distribution of not more than 5, as expressed in terms of a $D_{90}/D_{10}$ ratio, wherein $D_{10}$ and $D_{90}$ are as defined above.

16 Claims, 8 Drawing Sheets

ALUMINA COMPOSITION, ALUMINA MOLDED ARTICLE, ALUMINA CERAMICS, AND PROCESS FOR PRODUCING CERAMICS

This is a Continuation of application Ser. No. 08/281,095 filed Jul. 27, 1994 now abandoned.

FIELD OF THE INVENTION

This invention relates to an alumina molding composition, alumina molded articles prepared from the composition, alumina ceramics obtained from the alumina molded articles, and a process for producing the alumina ceramics.

BACKGROUND OF THE INVENTION

With the recent development of electronics industry, dielectric ceramics has been steadily extending its application to IC packages, HIC substrates, multi-layer substrates, etc. The most widespread dielectric ceramics are alumina ceramics having well-balanced properties, such as electric properties, mechanical properties, and thermal properties.

Alumina ceramic plates used as various substrates, for example, are usually produced by calcining an alumina molded article, called an alumina green sheet, obtained by tape casting. Tape casting, also called a doctor blade method, comprises spreading a slurry (alumina composition) of α-alumina in an aqueous or non-aqueous liquid comprising a solvent, a plasticizer, a binder, etc. on a carrier film from a knife edge called a doctor and drying the cast slurry to obtain an alumina green sheet. For the detail of the tape casting, reference can be made to *Ceramics Kako Handbook* (Ceramics Working Handbook), pp. 122–123, Kensetsu Sangyo Chosakai (1987).

It is important for alumina ceramics for the above-mentioned application to have high dimensional precision, such as low anisotropy of shrinkage and warp resistance on sintering, as well as high density, mechanical strength, surface smoothness, and binder removing properties. However, conventional α-alumina has a broad particle size distribution and an irregular primary particle shape, failing to provide uniform alumina molded articles. It has been difficult to obtain an alumina ceramic plate having excellent dimensional precision free from anisotropy of shrinkage or warpage from such α-alumina by the above-mentioned tape casting. It has therefore been demanded to reduce anisotropy of shrinkage and warpage on sintering and to improve dimensional precision.

Other alumina ceramic products include containers for physicochemical laboratories or industry (e.g., crucibles), protective tubing, guide eyes, and bioceramics. These products are produced by sintering an alumina molded article (also called an alumina green body) which is obtained by slip casting (also called a slurry casting method) comprising casting an alumina composition (a dispersion of α-alumina in a dispersing medium) in a slip casting mold having water absorbing property, for example, a plaster mold, setting the composition to a desired shape and a desired thickness, followed by drying. The latest slip casting technique allows to produce ceramics of complicated shape or large size with relatively simple equipments and can be automated and therefore has been drawing attention.

However, since conventional α-alumina cannot provide a uniform alumina molded article as described above, slip casting also encounters difficulty in obtaining alumina ceramics meeting the demands, i.e., excellent dimensional precision.

Therefore, it has been demanded to improve dimensional precision of alumina ceramics by reducing warpage and anisotropy of shrinkage on sintering.

SUMMARY OF THE INVENTION

An object of the present invention is to provide an alumina composition which provides on sintering an alumina ceramic having warp resistance and high dimensional precision as well as other important properties.

Another object of the present invention is to provide an alumina molded article obtained from the alumina composition.

A further object of the present invention is to provide an alumina ceramic obtained from the alumina molded article.

A still further object of the present invention is to provide a process for producing an alumina ceramic from the molded article.

These and other objects and effects of the present invention will be apparent from the following description.

As a result of extensive investigations on alumina ceramics, the present inventors have found that the above objects of the present invention are accomplished by an alumina composition comprising specific α-alumina.

The present invention relates to an alumina composition comprising α-alumina particles having a ratio of the shortest diameter to the longest diameter of from 0.3 to 1; and a size distribution of not more than 5, as expressed in terms of a $D_{90}/D_{10}$ ratio, wherein $D_{10}$ and $D_{90}$ represent a cumulative 10% diameter and a cumulative 90% diameter, respectively, of a cumulative distribution depicted from the small diameter side.

The present invention further relates to an alumina composition comprising α-alumina particles having a polyhedral shape; a D/H ratio of from 0.5 to 3.0, wherein D represents a maximum particle diameter parallel to a hexagonal lattice plane of a hexagonal close-packed lattice of α-alumina, and H represents a particle diameter perpendicular to the lattice plane; and a size distribution of not more than 5, as expressed in terms of a $D_{90}/D_{10}$ ratio, wherein $D_{10}$ and $D_{90}$ are as defined above.

The present invention furthermore relates to an alumina molded article and an alumina ceramic prepared from each of the above-described alumina compositions and to a process for producing the alumina ceramic.

DETAILED DESCRIPTION OF THE INVENTION

The α-alumina which can be used in the present invention comprises α-alumina particles having a ratio of the shortest diameter to the longest diameter (hereinafter referred to as a "short diameter/long diameter ratio") of from 0.3 to 1 and a size distribution of not more than 5, as expressed in terms of a $D_{90}/D_{10}$ ratio, wherein $D_{10}$ and $D_{90}$ represent a cumulative 10% diameter and a cumulative 90% diameter, respectively, of a cumulative distribution depicted from the small diameter side. Such α-alumina can be prepared, for example, by calcining transition alumina or an alumina raw material capable of being converted to transition alumina on heating (hereinafter referred to as a "transition alumina precursor") in the presence or absence of a seed crystal in (1) a gas atmosphere containing a hydrogen halide or (2) a gas atmosphere containing a component prepared from a halogen and steam.

Transition alumina means all alumina species included under polymorphic alumina represented by $Al_2O_3$ except α-alumina. Specific examples of the transition alumina include γ-alumina, δ-alumina, and θ-alumina. The transition alumina precursor includes those that can be converted to α-alumina via transition alumina by calcination. Examples of the transition alumina precursor include aluminum hydroxide, aluminum sulfate, alum (e.g., potassium aluminum sulfate or ammonium aluminum sulfate), ammonium aluminum carbonate, and alumina gel (e.g., one obtained by electro-discharge in water).

The transition alumina and transition alumina precursors which can be used in the process are not particularly limited in synthesis. For example, aluminum hydroxide can be obtained by a Bayer process, hydrolysis of an organoaluminum compound, or a process starting with an aluminum compound recovered from an etching waste used for condensers, etc. Transition alumina can be obtained by a heat treatment of aluminum hydroxide, decomposition of aluminum sulfate, decomposition of alum, gaseous phase decomposition of aluminum chloride, or decomposition of ammonium aluminum carbonate.

For controlling particle size of the α-alumina in a preferred range hereinafter described, calcination in the presence of seed crystals is preferred.

The seed crystal which can be used in the process is a crystal serving as a nucleus for crystal growth of α-alumina. A crystal of α-alumina grows around the seed crystal. Any seed crystal may be used as long as this function is performed. Preferred seed crystals include compounds of aluminum, titanium, vanadium, chromium, iron or nickel and mixtures thereof. The compounds of these metals include oxides, nitrides, oxinitrides, carbides, carbide nitrides, and borides, with oxides and nitrides being preferred.

The amount of the seed crystal is usually from 10 ppm to 50 parts by weight, preferably from 100 ppm to 30 parts by weight, still preferably from 200 ppm to 10 parts by weight, per 100 parts by weight of transition alumina to be used or to be converted from its precursor.

The primary particle size of α-alumina obtained can be controlled by the number of the seed crystal to be added. The more the number of the seed crystals are added, the smaller the size of α-alumina can be obtained.

The seed crystals can be used in combination of two or more kinds thereof.

The process is generally carried out by mixing the above-mentioned materials (i.e., transition alumina and/or a precursor thereof, and a seed crystal) and calcining the mixture. The method of mixing is not particularly restricted. Where a wet mixing method is followed, for example, either an aqueous solvent or an organic solvent may be used. Mixing can be conducted by means of a ball mill or a vertical granulator. Ultrasonication and stirring may also be employed. Worn substance of the materials in a mixing device, such as a mixing medium, may be used as a seed crystal. For example, α-alumina worn substance generated from α-alumina-made balls during the ball mill mixing may be used as a seed crystal.

The transition alumina and/or a precursor thereof, mixed with or without the seed crystal is calcined in (1) a gas atmosphere containing a hydrogen halide preferably in a concentration of at least 0.1% by volume, more preferably 0.5% by volume or more, and most preferably 1.0% by volume or more. Component(s) other than hydrogen halide in the gas atmosphere, what is called, diluent gas include inert gases, e.g., nitrogen, hydrogen, and argon, and air. The pressure of the gas atmosphere is not critical and may be selected arbitrarily from an industrially practical range. α-Alumina according to the process having the excellent properties as desired can be obtained by calcination in a relatively low temperature as hereinafter described.

The gas atmosphere containing hydrogen halide (1) may be replaced with (2) a gas atmosphere containing a component prepared from a halogen and steam. In this case, transition alumina and/or a precursor thereof is calcined in an atmosphere containing the component prepared from a halogen preferably in a concentration of 0.1% by volume or more, more preferably 0.5% by volume or more, and most preferably 1.0% by volume or more, and steam preferably in a concentration of 0.01% by volume or more, more preferably 0.1% by volume or more, and most preferably 0.5% by volume or more. The component prepared from a halogen and steam can be obtained in a usual manner, for example, by introducing a halogen and steam into the system. A halogen and steam may previously be mixed and then introduced to the system. Component(s) other than the component prepared from the halogen and stem in the gas atmosphere, what is called, diluent gas include inert gases, e.g., nitrogen, hydrogen, and argon, and air. The pressure of the atmosphere is not particularly critical and may be selected arbitrarily from an industrially practical range. α-Alumina powder according to the process having the excellent properties as desired can be obtained by calcination in a relatively low temperature as hereinafter described.

When the calcining is conducted in a gas atmosphere containing a hydrogen halide (1) or a gas atmosphere containing a component prepared from a halogen and steam (2), the calcining temperature is preferably from 500° to 1400° C., more preferably from 600° to 1300° C., and most preferably from 700° and 1200° C.

Calcination of transition metal and/or a precursor thereof should be continued for such a time sufficient for the starting material to grow to α-alumina. While depending on the concentration of the gas atmosphere, the calcining temperature, and the like conditions, the calcination time is generally 1 minute or more, and preferably 10 minutes or more, but not limited thereto.

The source of gas and the method of supplying gas to the system are not particularly restricted, as long as the above-mentioned gas atmosphere is fed to the reaction system containing the starting materials. For example, a cylinder containing the gas is usually used as a supply source. Where an aqueous solution of a hydrogen halide, a halogen compound, e.g., an ammonium halide, or a halogen-containing high polymer is used, it can be fed at its vapor pressure or as decomposed so as to give a prescribed gas composition. The gas supply may be either in a continuous manner or in a batch system.

The calcining apparatus is not particularly limited, and a general calcining furnace can be employed. The calcining furnace is preferably made of a material resistant to corrosion by a hydrogen halide gas, a halogen gas, etc. The furnace is preferably equipped with a mechanism for controlling the atmosphere. Because an acidic gas, e.g., a hydrogen halide or a halogen gas, is used, the furnace is preferably air-tight. For industrial production, calcination is preferably carried out in a continuous manner by means of, for example, a tunnel kiln, a rotary kiln or a pusher oven.

Since the reaction proceeds in an acidic gas atmosphere, a crucible, a boat or a like tool used in the process is preferably made of alumina, quartz, acid resistant brick or graphite.

According to the above-mentioned process, the α-alumina powder having a narrow particle size distribution and thus useful in the present invention can be obtained. Depending on the starting materials or production conditions, cases are sometimes met with in which the α-alumina particles undergo agglomeration to have a broader size distribution. Even in such cases, the agglomerating force is so weak that simple grinding would provide α-alumina of narrow size distribution without producing too fine particles.

The resulting α-alumina comprises α-alumina particles which are homogeneous, usually have a particle density (true density) of not less than 3.95 g/cm$^3$, preferably not less than 3.97 g/cm$^3$, and have a short diameter/long diameter ratio of from 0.3 to 1 and a $D_{90}/D_{10}$ ratio of not more than 5, preferably a $D_{50}/D_{10}$ ratio of not more than 2.5, wherein $D_{50}$ represent a cumulative 50% diameter of a cumulative distribution depicted from the small diameter side, and $D_{10}$ and $D_{90}$ are as defined above.

Where the α-alumina particles have a polyhedral shape, the α-alumina comprises α-alumina particles which are homogeneous and have a D/H ratio of from 0.5 to 3.0, wherein D represents a maximum particle diameter parallel to a hexagonal lattice plane of a hexagonal close-packed lattice of α-alumina, and H represents a maximum particle diameter perpendicular to the lattice plane, and a $D_{90}/D_{10}$ ratio of not more than 5, preferably a $D_{50}/D_{10}$ ratio of not more than 2.5, wherein $D_{10}$, $D_{50}$, and $D_{90}$ are as defined above.

The primary particles constituting the α-alumina preferably have a number average particle size of from 0.1 to 5 μm, and more preferably from 0.2 to 5 μm. The alumina purity is preferably not less than 99.90% by weight, and more preferably not less than 99.95% by weight. The number particle size distribution of the primary particles preferably has a standard deviation of not more than 0.25.

The alumina composition of the present invention can be prepared by mixing the above-mentioned α-alumina with a solvent (a dispersing medium), a dispersing agent, a binder, etc. The kinds and concentrations of components other than α-alumina are appropriately decided according to the final product, alumina ceramics.

For example, an alumina composition to be molded by tape casting generally contains, in addition to α-alumina, a sintering agent, a solvent, a dispersing agent, a binder, a plasticizer, etc. An illustrative example of such a composition comprises 100 parts by weight of α-alumina; 0.01 to 15 parts by weight, preferably 0.01 to 12 parts by weight, of a sintering agent; 5 to 300 parts by weight, preferably 5 to 100 parts by weight, of a solvent; 0.1 to 10 parts by weight, preferably 0.1 to 2 parts by weight, of a dispersing agent; 1 to 50 parts by weight, preferably 1 to 10 parts by weight, of a binder; and 0.5 to 30 parts by weight, preferably 0.5 to 10 parts by weight, of a plasticizer. The viscosity of the composition is generally controlled from 5000 to 40000 cps, preferably from 5000 to 30000 cps at room temperature, for example, by controlling the amount of the solvent.

The kinds of the components other than α-alumina are selected appropriately according to the use of the final product. Examples of the sintering agents include MgO, $SiO_2$, CaO, talc, and basic magnesium carbonate. Examples of the solvents include alcohols, such as ethanol and isopropyl alcohol, aromatic hydrocarbons, such as toluene, ketones, such as cyclohexanone and acetone, and water. Examples of the dispersing agents include glycerol trioleate and Menhaden fish oil. Examples of the binders include polyvinyl alcohol and polyvinyl butyral. Examples of the plasticizers include dioctyl phthalate and polyethylene glycol.

Mixing of α-alumina and the other components can be carried out in a conventional manner, for example, by means of a ball mill or a vibration mill.

An alumina composition to be molded by slip casting generally contains, in addition to α-alumina, a solvent (a dispersing medium), a dispersing agent, a binder, etc. If desired, the composition may contain a defoaming agent, sintering agent or any other additives generally used in slip casting. An illustrative example of such a composition comprises 100 parts by weight of α-alumina; 10 to 100 parts by weight, preferably 10 to 60 parts by weight, of a solvent; 0.01 to 5 parts by weight, preferably 0.01 to 0.5 part by weight, of a dispersing agent; 0.01 to 2 parts by weight of a binder; and, if desired, 0.01 to 1 part by weight, preferably 0.01 to 0.3 part by weight, of a defoaming agent. The viscosity of the composition is generally controlled from 10 to 1000 cps, preferably from 10 to 200 cps at room temperature, for example, by controlling the amount of the solvent.

The kinds of the components other than α-alumina are selected appropriately according to the use of the final product. Examples of the solvents include organic solvents, such as ethanol, petroleum ether, isobutyl acetate, toluene, and glycerol; and water. Examples of the dispersing agents include polycarboxylic acids, polyacrylic acid, and a wax emulsion. Example of the binders include polyvinyl alcohol, acrylic polymers, and polyvinyl butyral. Examples of the defoaming agents include wax emulsions. Examples of the sintering agents include MgO, $SiO_2$, CaO, talc, and basic magnesium carbonate.

Mixing of α-alumina and the other components can be carried out in a conventional manner, for example, by means of a ball mill or a vibration mill.

The alumina composition of the present invention is molded into an alumina molded article by casting into a casting mold or flow casting on a film carrier, followed by drying.

For example, tape casting is usually performed by casting the alumina composition running from a knife edge called a doctor on a film carrier, followed by drying to obtain an alumina molded article, also called an alumina green sheet. The thickness of the alumina green sheet is selected appropriately according to the end use, usually ranging from about 0.01 to 2 mm. The resulting alumina green sheet generally has a high alumina content of not less than 52% by weight, preferably not less than 55% by weight. Since the α-alumina has a narrow primary particle size distribution, and the molded article has homogeneous denseness and contains no fine particles, the green sheet is homogeneous as a whole, has a large average pore size and a narrow pore size distribution, and exhibits excellent properties in binder removal.

Slip casting can usually be carried out by casting the alumina composition in a water-absorbing slip casting mold, letting the composition set to have desired shape and thickness, followed by drying to obtain an alumina molded article, also called an alumina green body.

The slip casting mold to be used includes a plaster mold, a plastic mold, a wood mold, and a rubber mold. The resulting alumina green body generally has a high alumina content of not less than 52% by weight, preferably not less than 55% by weight. Since the α-alumina has a narrow primary particle size distribution, and the molded article has homogeneous denseness and contains no fine particles, the green body obtained by slip casting is homogeneous as a whole, has a large average pore size and a narrow pore size distribution, and exhibits excellent properties in binder removal similarly to the alumina green sheet obtained by tape casting.

The thus obtained alumina molded articles are sintered to provide alumina ceramics. The sintering conditions, such as temperature, time, atmosphere, etc. are appropriately decided according to the end use.

For example, the alumina green sheet obtained by tape casting is usually sintered at a temperature of from 1400° to 1650° C. for about 0.5 to 5 hours in air or a reducing atmosphere, or in vacuo. For uses requiring transparency, for example window materials of EP-ROM, calcination in a reducing atmosphere or in vacuo provides a transparent alumina ceramic. The warp which occurs on sintering is usually not greater than 0.5 mm, preferably not greater than 0.3 mm, per size of 1 inch×1 inch with a thickness of 1 mm of the obtained ceramic. The anisotropy of shrinkage defined by formula (I) below is generally 0.2% or less, and preferably 0.15% or less:

$$\text{Anisotropy of shrinkage} = |(1-a/A)-(1-b/B)| \times 100 \quad (I)$$

wherein A and B represent the length (dimension along the direction of molding) and the width (dimension perpendicular to the direction of molding) of a sample of the alumina molded article, respectively; and a and b represent the length and the width of an alumina ceramic obtained by sintering the sample.

The shape and size of the alumina ceramic are appropriately selected according to the end use, and so is the thickness. The thickness is usually from 0.03 to 2 mm. The density of the alumina ceramic varies depending on the kind and amount of the sintering agent added. For example, when the amount of the sintering agent is about 4 wt %, the density is generally at least 3.7 g/cm$^3$, and preferably at least 3.73 g/cm$^3$; and when the particle diameter of the α-alumina contained is 1 μm or less and the amount of the sintering agent is 0.1 wt % or less, the density is generally at least 3.9 g/cm$^3$ and preferably at least 393 g/cm$^3$.

The alumina green body obtained by slip casting is usually calcined at a temperature of from 1400° to 1650° C. for about 0.5 to 5 hours in air or a reducing atmosphere, or in vacuo. For uses requiring transparency, calcination in a reducing atmosphere or in vacuo provides a transparent alumina ceramic. The warp which occurs on sintering is usually not greater than 5 mm, preferably not greater than 3 mm, per size of 40 mm×40 mm with a thickness of 5 mm of the alumina molded article. The shape, size, and thickness of the alumina ceramic are appropriately selected according to the end use.

The density of the alumina ceramic is generally at least 3.9 g/cm$^3$, and preferably at least 3.93 g/cm$^3$, when the particle diameter of the α-alumina contained is 1 μm or less and the amount of the sintering agent is 0.1 wt % or less.

The shrinkage upon sintering defined by formula (II) below is generally 18% or less, and preferably 16% or less:

$$\text{Shrinkage} = (1-(D_m/D_c)^{1/3}) \times 100 \quad (II)$$

wherein $D_m$ represents the density of the alumina molded article, and $D_c$ represents the density of the alumina ceramic.

Because the alumina molded articles obtained from the α-alumina composition of the present invention has a high density and excellent homogeneity, the alumina ceramics obtained therefrom by sintering exhibit not only high mechanical strength, surface smoothness, and binder removing properties but also excellent dimensional precision, i.e., warp resistance, low anisotropy of shrinkage and reduced shrinkage at the time of sintering. These excellent properties make the alumina ceramics extremely useful as dielectric ceramics for substrates of various IC devices and flash memories, laboratory or industrial containers, protective tubing, guide eyes, and bioceramics.

The present invention will now be illustrated in greater detail with reference to Examples, but it should be understood that the present invention is not construed as being limited thereto. All the parts and percents are by weight.

Measurements in Examples and Comparative Examples were carried out in the following manners:

1) Number Average Particle Size and Size Distribution:

$D_{90}/D_{10}$ and $D_{50}/D_{10}$ ratios were measured with Master Sizer (manufactured by Malbern Co.) on the basis of laser scattering.

A micrograph of α-alumina powder was taken with a scanning electron microscope (SEM) ("T-300" manufactured by JEOL Ltd.), and 80 to 100 particles selected were subjected to image analysis to obtain an average circle-equivalent diameter and its distribution. The term "circle-equivalent diameter" as used herein means a diameter of a true circle having the same area as that of a particle.

2) Short Diameter/Long Diameter Ratio and D/H Ratio:

The shape of α-alumina particles was expressed in terms of a short diameter/long diameter ratio and a D/H ratio, wherein D and H are as defined above. Five to 10 particles were selected from the above-mentioned SEM photograph and subjected to image analysis to obtain a D/H ratio and a short diameter/long diameter ratio as an average.

3) Alumina Purity:

The amount of impurity ions was measured by emission spectroscopic analysis and the impurity content was reduced to an oxide content.

4) Density of Molded Articles and Sinters (Ceramics):

The density was measured with a specific gravimeter for solids (manufactured by Shimadzu Corporation) on the Archimedes' principle.

5) Cracks:

Cracks of the alumina green sheet were observed with the naked eye.

6) Particle Packing State in Molded Articles:

The alumina molded article was calcined at 1100° C. to remove the binder. A micrograph of the surface of the calcined sheet was taken with an SEM, and the image was analyzed to obtain a particle size distribution.

7) Pore Size Distribution in Molded Articles:

The alumina molded article was calcined at 1100° C. to remove the binder. The pore size distribution was measured with a mercury porosimeter Autoscan 60 (manufactured by Yuasa Ionics Co., Ltd.) to obtain an average pore diameter.

8) Warp:

The alumina ceramic obtained in Example 1 (1 inch×1 inch with a thickness of 1 mm) was put on a platen. The difference (mm) between the highest point and the lowest point was taken as a warp. The difference (mm) between the highest point and the lowest point was taken as a warp.

The alumina green sheet obtained in Example 2 (40 mm×40 mm with a thickness of 5 mm) was sintered, and the resulting sintered sheet was put on a platen. The difference (mm) between the highest point and the lowest point was taken as a warp.

9) Anisotropy of Shrinkage:

The length (dimension along the direction of molding) and the width (dimension perpendicular to the direction of molding) of the alumina molded article, and the length and the width of the resulting alumina ceramic were measured. The anisotropy of shrinkage was determined by formula (I) above.

10) Particle Density of Alumina Particles:

The particle density of alumina particles was measured with Pentapycnometer manufactured by Yuasa Ionics co., Ltd. based on gaseous displacement with He gas (pressure comparison method). The alumina to be measured for the particle density was subjected to a pretreatment in the following manner: Powder having a particle size of 2 μm or smaller was shaped into pellets of about 19 mm in diameter and 8 mm in thickness. Powder of 6 μm or greater was used as such. The sample (powder or pellets) was dried at 105° C and purged by pulsing (15 times) to measure the particle density.

SYNTHESIS EXAMPLE 1

Two hundred grams of transition alumina powder obtained by hydrolysis of an organoaluminum compound ("AKP-G15" produced by Sumitomo Chemical Co., Ltd.) and 11.6 g of α-alumina ("AKP-50" produced by Sumitomo Chemical Co., Ltd.) as seed crystals were mixed.

An about 200 g aliquot of the mixture was put in a graphite boat and calcined in a tubular furnace using an quartz-made core tube. The temperature was raised at a rate of 500° C./hr while feeding nitrogen gas, and hydrogen chloride gas from a cylinder was introduced into the tubular furnace when the temperature reached 800° C. The gas concentration was controlled by adjustment of the gas flow rate by means of a flowmeter. The linear flow rate was set at 20 mm/min. The total pressure of the gas atmosphere was atmospheric pressure.

Figure 1:
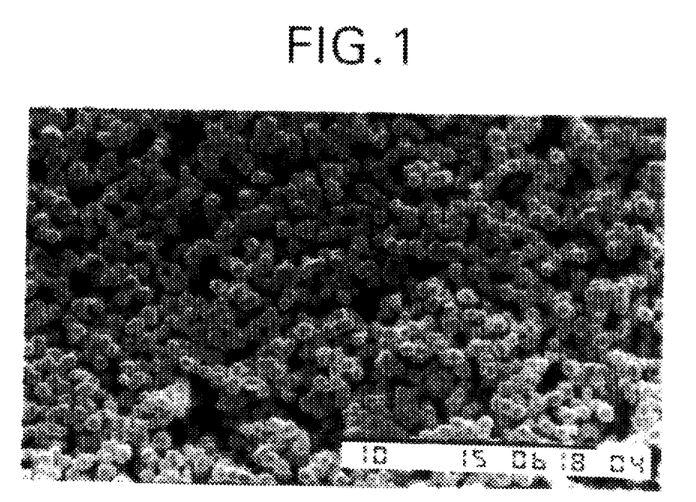
FIG. 1 is a scanning electron microscope (SEM) photograph (magnification: 4300) showing the particulate structure of the α-alumina powder obtained in Synthesis Example 1.
Figure 2:
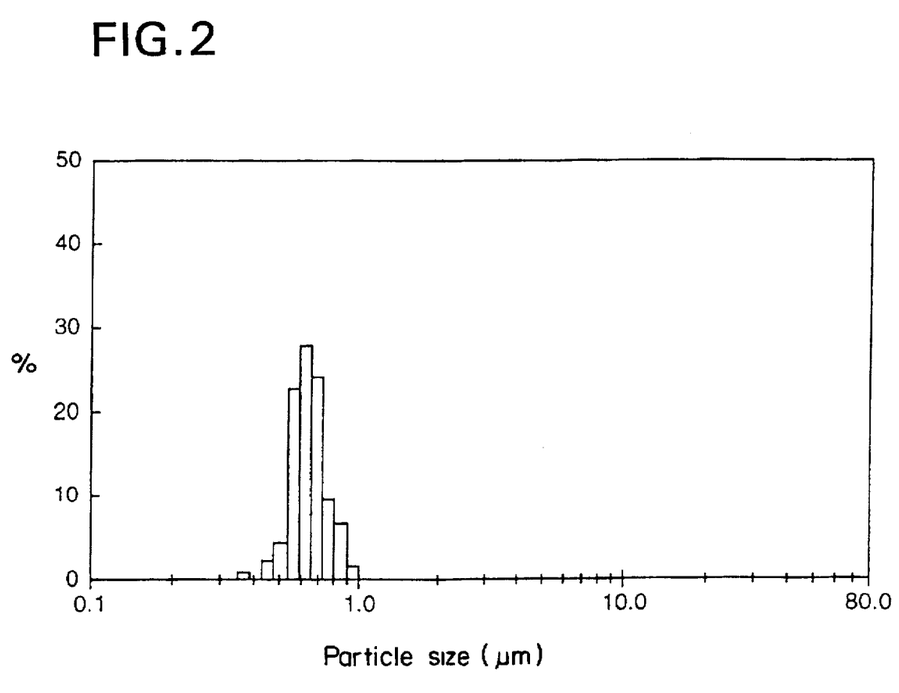
FIG. 2 is a particle size distribution of the α-alumina powder obtained in Synthesis Example 1.

On reaching 1100° C., the furnace was maintained at that temperature for 30 minutes, followed by allowing to cool. The resulting powder was ground to obtain α-alumina particles having a short diameter/long diameter ratio of about 1, a D/H ratio of about 1, a number average particle size of 0.6 μm, a $D_{90}/D_{10}$ ratio of 3, and a $D_{50}/D_{10}$ ratio of 1.9. The alumina purity was 99.95% or higher, and the particle density of the particles was 3.98 g/cm³. The SEM photograph of the resulting α-alumina powder is shown in FIG. 1, and its particle size distribution in FIG. 2.

EXAMPLE 1

1) Preparation of Alumina Composition for Tape Casting:

To 150 parts of the α-alumina obtained in Synthesis Example 1 was added 0.3 part of magnesium oxide powder ("HP-30" produced by Kamishima Kagaku K.K.), and the mixture was mixed in a ball mill. The mixed powder was further dry blended in a 2 l-volume polyethylene pot together with plastic balls for 5 hours. To the mixed powder were added 3.0 parts of glycerol trioleate and 132.0 parts of a 6/3/1 (by weight) mixture of toluene, ethanol, and cyclohexanone, and the mixture was wet blended in a 2 l-volume polyethylene pot together with balls for 16 hours. Then, 12.0 parts of a polymer binder ("BLS Binder", a polyvinyl-based binder produced by Sekisui Chemical Co., Ltd.), 21.9 parts of ethanol, and 6.0 parts of dioctyl phthalate as a plasticizer were added thereto, followed by ball milling for 6 hours. The solvent was removed in an evaporator to adjust the viscosity of about 20000 cps to prepare a slurry for tape casting.

Figure 3:
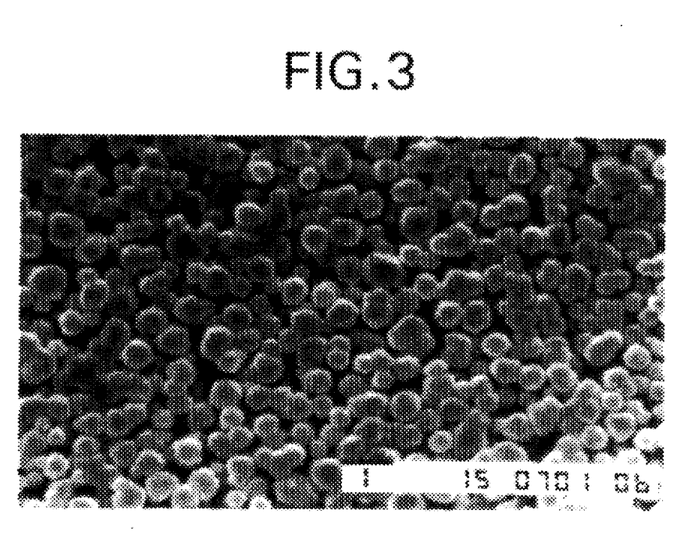
FIG. 3 is an SEM photograph (magnification: 8500) showing the particulate structure of the α-alumina powder on the surface of the alumina green sheet obtained in Example 1-(2).
Figure 4:
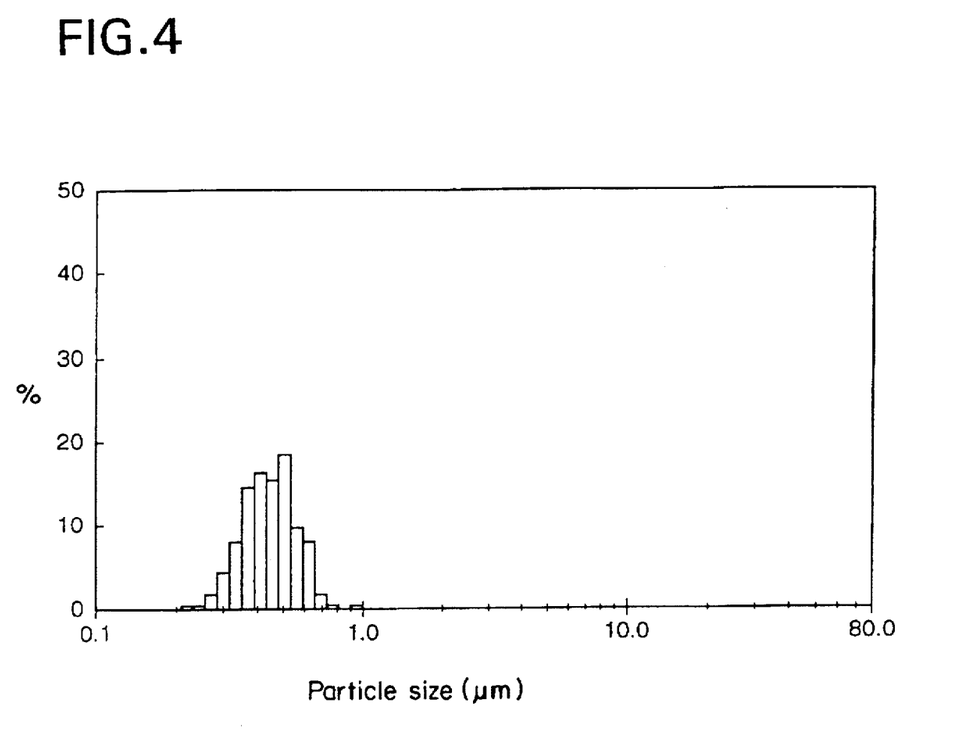
FIG. 4 is a particle size distribution of the α-alumina powder on the surface of the alumina green sheet obtained in Example 1-(2).

2) Preparation of Alumina Green Sheet and Alumina Ceramic Plate by Tape Casting:

The slurry prepared in (1) above was tape cast at a molding speed of 300 mm/min at a blade gap of 1.45 mm to obtain a 0.6 mm thick alumina green sheet. A 30 mm square was punched out of the alumina green sheet and sintered in air at 1600° C. to obtain an inch square with thickness of 0.5 mm of an alumina ceramic plate. The density, warp and shrinkage of the ceramic plate were measured. Further, the average pore diameter of the alumina green sheet was measured. The measurements obtained are shown in Table 2 below. The SEM photograph of the surface of the alumina green sheet is shown in FIG. 3, and the particle size distribution of the alumina green sheet in FIG. 4.

COMPARATIVE EXAMPLE 1

The transition alumina used in Synthesis Example 1 (AKP-G15) was calcined in air to obtain α-alumina particles having a number average particle size of 0.2 μm. The short diameter/long diameter ratio and D/H ratio of the resulting particles were non-uniform due to agglomeration of particles. The α-alumina comprised spherical α-alumina particles.

Figure 5:
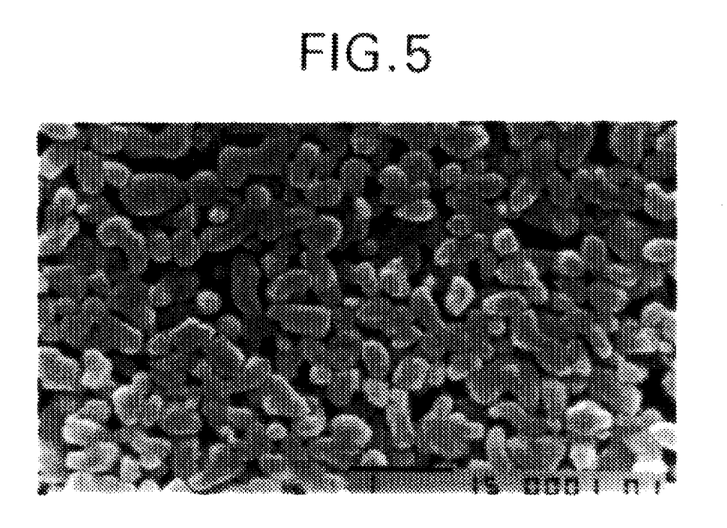
FIG. 5 is an SEM photograph (magnification: 17000) showing the particulate structure of the α-alumina powder on the surface of the alumina green sheet obtained in Comparative Example 1.
Figure 6:
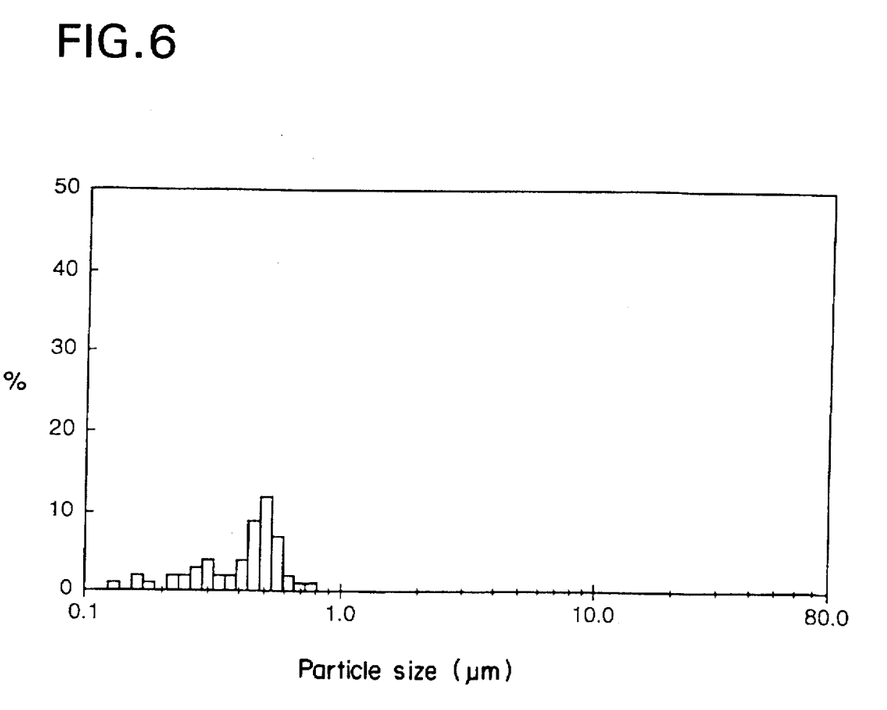
FIG. 6 is a particle size distribution of the α-alumina powder on the surface of the alumina green sheet obtained in Comparative Example 1.
Figure 7:
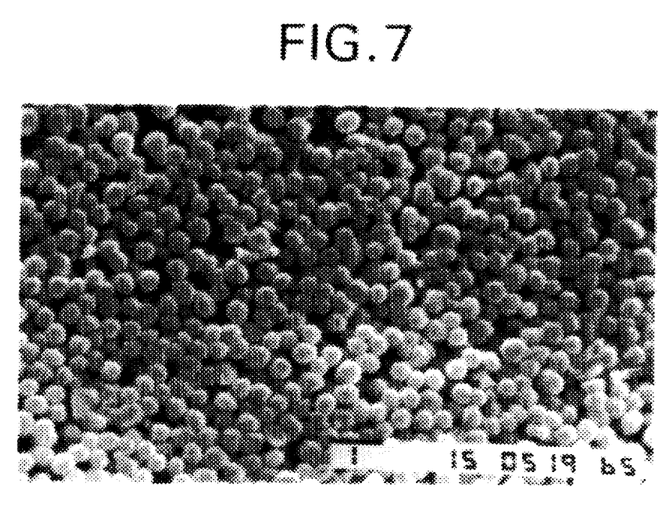
FIG. 7 is an SEM photograph (magnification: 8500) showing the particulate structure of the α-alumina powder on the surface of the alumina green body obtained in Example 2-(2).
Figure 8:
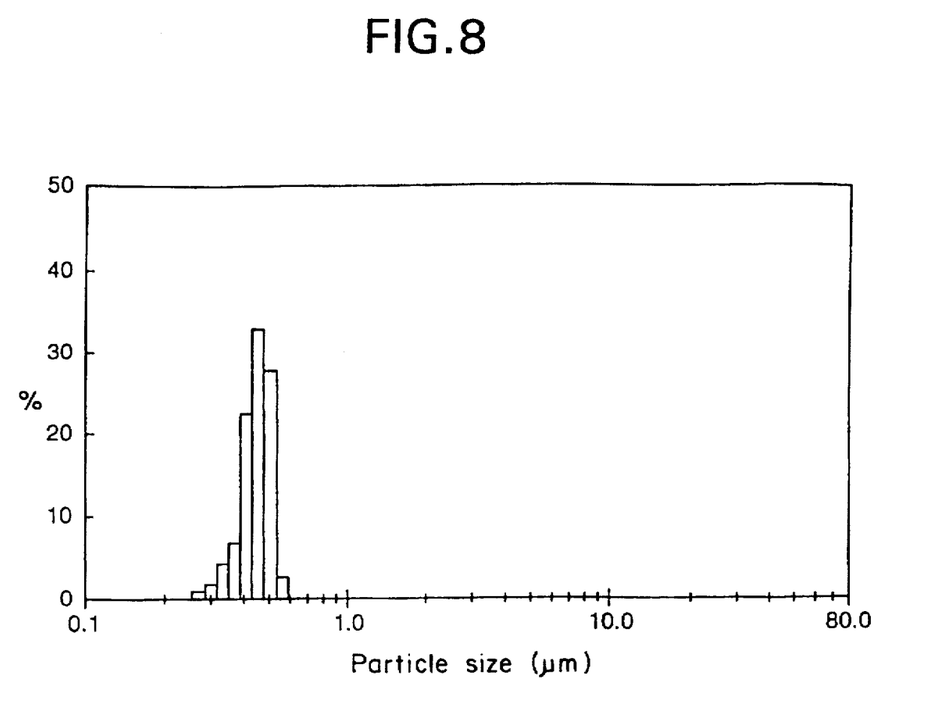
FIG. 8 is a particle size distribution of the α-alumina powder on the surface of the alumina green body obtained in Example 2-(2).

In the same manner as in Example 1, an alumina composition was prepared from the resulting α-alumina, and an alumina green sheet and an alumina ceramic plate were prepared therefrom. The measurements obtained in the same manner as in Example 1 are shown in Table 2. The SEM photograph of the surface of the alumina green sheet is shown in FIG. 5, and the particle size distribution of the alumina green sheet in FIG. 6.

The properties of the α-alumina particles prepared in Synthesis Example 1 and Comparative Example 1 are tabulated in Table 1 below.

TABLE 1

| Example No. | Number Average Particle Size (μm) | Standard Deviation of Primary Particle Size Distribution | D/H Ratio | Alumina Parity (%) |
| --- | --- | --- | --- | --- |
| Synthesis Example 1 | 0.6 | 0.15 | 1 | ≧99.95 |
| Comparative Example 1 | 0.2 | 0.28 | non-uniform | ≧99.95 |

TABLE 2

| Example No. | Density of Green Sheet (g/cm³) | Average Pore Diameter (μm) | Cracks | Density of Ceramic (g/cm³) | Warp (mm) | Anisotrophy of Shrinkage (%) |
| --- | --- | --- | --- | --- | --- | --- |
| Example 1 | 2.32 | 0.18 | none | 3.94 | 0.1 | 0.1 |
| Comparative Example 1 | 1.92 | 0.12 | observed | 3.92 | 0.5 | 0.5 |

EXAMPLE 2

1) Preparation of Alumina Composition for Slip Casting:

A hundred parts of the α-alumina obtained in Synthesis Example 1, 40 parts of water, 1.0 part of an acrylic dispersing agent ("SN-D-5468" produced by Sannopuko Co.), 0.1 part of polyvinyl alcohol, and 0.1 part of a defoaming agent ("Antifroth F102" produced by Dai-ichi Kogyo Seiyaku Co., Ltd.) were mixed in a ball mill for 2 hours to prepare a slurry for slip casting.

2) Preparation of Alumina Green Body:

The slurry obtained in (1) above was cast in a plaster mold. After having its water content absorbed in the plaster mold, the slurry was spontaneously dried to obtain a body of a size of 40 mm×40 mm with a thickness of 5 mm. The density of the resulting alumina green body was measured. The result is shown in Table 3 below.

3) Preparation of Alumina Ceramic Plate:

The alumina green body obtained in (2) above was calcined in air at 1600° C. for 2 hours to obtain an alumina ceramic plate. The density and warp of the plate were measured. The results are shown in Table 3.

COMPARATIVE EXAMPLE 2

The transition alumina used in Synthesis Example 1 (AKP-G15) was calcined in air to obtain α-alumina particles having a number average particle size of 0.3 μm. The short diameter/long diameter ratio and D/H ratio of the resulting particles were non-uniform due to agglomeration of particles. The alumina purity was 99.95% or higher. The α-alumina comprised agglomerated spherical α-alumina particles.

In the same manner as in Example 2, an alumina composition for slip casting was prepared from the resulting α-alumina, and an alumina green body and an alumina ceramic plate were prepared therefrom. The measurements obtained in the same manner as in Example 1 are shown in Table 3.

TABLE 3

| Example No. | Density of Green Body (g/cm³) | Density of Ceramic Plate (g/cm³) | Warp of Ceramic Plate (mm) | Anisotropy of shrinkage (%) |
| --- | --- | --- | --- | --- |
| Example 2 | 2.40 | 3.94 | 3 | 15.2 |
| Comparative Example 2 | 1.98 | 3.94 | 8 | 20.5 |

While the invention has been described in detail and with reference to specific examples thereof, it will be apparent to one skilled in the art that various changes and modifications can be made therein without departing from the spirit and scope thereof.

What is claimed is:

1. An alumina molded article obtained by a method comprising the step of casting an alumina composition, said alumina composition comprising α-alumina particles having a ratio of the shortest diameter to the longest diameter of from 0.3 to 1; and a particle size distribution of not more than 5, as expressed in terms of a $D_{90}/D_{10}$ ratio, wherein $D_{10}$ and $D_{90}$ represent a cumulative 10% diameter and a cumulative 90% diameter, respectively, of a cumulative distribution depicted from the small diameter side, or said alumina composition comprising α-alumina particles having a polyhedral shape; a D/H ratio of from 0.5 to 3.0, wherein D represents a maximum particle diameter parallel to a hexagonal lattice plane of a hexagonal close-packed lattice of α-alumina, and H represents a maximum particle diameter perpendicular to the lattice plane; and a size distribution of not more than 5, as expressed in terms of a $D_{90}/D_{10}$ ratio, wherein $D_{10}$ and $D_{90}$ are as defined above.

2. An alumina molded article as claimed in claim 1, wherein said casting is tape casting.

3. An alumina molded article as claimed in claim 1, wherein said casting is slip casting.

4. An alumina ceramic obtained by a method comprising the steps of: casting an alumina composition to prepare an alumina molded article; and sintering said alumina molded article, said alumina composition comprising α-alumina particles having a particle ratio of the shortest diameter to the longest diameter of from 0.3 to 1; and a size distribution of not more than 5, as expressed in terms of a $D_{90}/D_{10}$ ratio, wherein D10 and $D_{90}$ represent a cumulative 10% diameter and a cumulative 90% diameter, respectively, of a cumulative distribution depicted from the small diameter side, or said alumina composition comprising α-alumina particles having a polyhedral shape; a D/H ratio of from 0.5 to 3.0, wherein D represents a maximum particle diameter parallel to a hexagonal lattice plane of a hexagonal close-packed lattice of α-alumina, and H represents a maximum particle diameter perpendicular to the lattice plane; and a size distribution of not more than 5, as expressed in terms of a $D_{90}/D_{10}$ ratio, wherein $D_{90}$ and $D_{90}$ are as defined above.

5. An alumina ceramic as claimed in claim 4, wherein said casting is tape casting.

6. An alumina ceramic as claimed in claim 4, wherein said casting is slip casting.

7. An alumina molded article as claimed in claim 1, wherein said e-alumina particles have a particle density of not less than 3.95 g/cm³.

8. An alumina molded article as claimed in claim 1, wherein said α-alumina particles have a particle density of not less than 3.97 g/cm$^3$.

9. An alumina molded article as claimed in claim 6, wherein said α-alumina particles have a particle size distribution of not more than 2.5, expressed in terms of $D_{50}/D_{10}$, wherein $D_{10}$ and $D_{50}$ represent a cumulative 10% diameter and a cumulative 50% diameter, respectively, of a cumulative distribution depicted from the small diameter side.

10. An alumina molded article as claimed in claim 1, wherein said α-alumina particles have an average primary particle size of from 0.1 to 5 μm.

11. An alumina molded article as claimed in claim 1, wherein said α-alumina particles have an alumina purity of not less than 99.90% by weight.

12. An alumina ceramic as claimed in claim 4, wherein said α-alumina particles have a particle density of not less than 3.95 g/cm$^3$.

13. An alumina ceramic as claimed in claim 4, wherein said α-alumina particles have a particle density of not less than 3.97 g/cm$^3$.

14. An alumina ceramic as claimed in claim 4, wherein said α-alumina particles have a particle size distribution of not more than 2.5, expressed in terms of $D_{50}/D_{10}$, wherein $D_{10}$ and $D_{50}$ represent a cumulative 10% diameter and a cumulative 50% diameter, respectively, of a cumulative distribution depicted from the small diameter side.

15. An alumina ceramic as claimed in claim 4, wherein said α-alumina particles have an average primary particle size of from 0.1 to 5 μm.

16. An alumina ceramic as claimed in claim 4, wherein said α-alumina particles have an alumina purity of not less than 99.90% by weight.

\* \* \* \* \*